(12) United States Patent
Ida et al.

(10) Patent No.: US 9,509,800 B2
(45) Date of Patent: Nov. 29, 2016

(54) DOCUMENT PRIORITY DETERMINATION APPARATUS AND DOCUMENT PRIORITY DETERMINATION METHOD

(71) Applicants: KABUSHIKI KAISHA TOSHIBA, Tokyo (JP); TOSHIBA TEC KABUSHIKI KAISHA, Tokyo (JP)

(72) Inventors: Toshihiro Ida, Shizuoka (JP); Kazuhiro Ogura, Kanagawa (JP); Shinji Makishima, Shizuoka (JP); Akihiro Mizutani, Shizuoka (JP); Yusuke Hamada, Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 269 days.

(21) Appl. No.: 14/185,623

(22) Filed: Feb. 20, 2014

(65) Prior Publication Data
US 2014/0237075 A1 Aug. 21, 2014

(30) Foreign Application Priority Data

Feb. 21, 2013 (JP) ................................. 2013-032212

(51) Int. Cl.
*H04L 29/08* (2006.01)
*G06F 17/30* (2006.01)
(52) U.S. Cl.
CPC ............ *H04L 67/322* (2013.01); *G06F 17/30* (2013.01); *G06F 17/30705* (2013.01); *H04L 67/06* (2013.01); *H04L 67/325* (2013.01)
(58) Field of Classification Search
CPC .... H04L 67/322; H04L 67/325; G06F 17/30

USPC .......................................................... 709/217
See application file for complete search history.

(56) References Cited

U.S. PATENT DOCUMENTS

| | | | |
|---|---|---|---|
| 2005/0010608 A1* | 1/2005 | Horikawa | G06F 9/4862 |
| 2009/0288090 A1* | 11/2009 | Ujibashi | G06F 9/5011 718/103 |
| 2012/0191653 A1 | 7/2012 | Ogura | |
| 2013/0185356 A1 | 7/2013 | Mizutani et al. | |
| 2013/0188219 A1 | 7/2013 | Ida et al. | |

FOREIGN PATENT DOCUMENTS

| | | |
|---|---|---|
| JP | 2013065297 | 4/2013 |
| JP | 2013069275 | 4/2013 |

OTHER PUBLICATIONS

U.S. Appl. No. 14/185,785, inventor Hagiwara et al., filed Feb. 20, 2014.
U.S. Appl. No. 14/185,702; inventor Mizutani et al., filed Feb. 20, 2014.

* cited by examiner

*Primary Examiner* — David Lazaro
*Assistant Examiner* — Zia Khurshid
(74) *Attorney, Agent, or Firm* — Patterson & Sheridan, LLP (57) ABSTRACT

A document priority determination apparatus comprises a program schedule retrieving unit configured to retrieve schedules of programs of an event, a current time detection unit configured to detect a current time, and a priority determination unit configured to set a priority of a document based on the retrieved program schedules and the detected current time.

20 Claims, 9 Drawing Sheets

<title>   A CONFERENCE   </title>

<date>   2013-01-13   </date>

■ ■ ■ ■ ■ ■ ■ ■ ■ ■ ■ ■

<agenda>   AGENDA 1   </agenda>

<starttime>   13:00   </starttime>

<endtime>   14:50   </endtime>

<title>   MATERIAL 1   </title>

<totalpage>   20   </totalpage>

■ ■ ■ ■ ■ ■ ■ ■ ■ ■ ■ ■

<agenda>   AGENDA 2   </agenda>

<starttime>   14:00   </starttime>

<endtime>   14:50   </endtime>

DOCUMENT PRIORITY DETERMINATION APPARATUS AND DOCUMENT PRIORITY DETERMINATION METHOD

CROSS-REFERENCE TO RELATED APPLICATION

This application is based upon and claims the benefit of priority from Japanese Patent Application No. 2013-032212, filed Feb. 21, 2013, the entire contents of which are incorporated herein by reference.

FIELD

Embodiments described herein relate to a document priority determination apparatus and a document priority determination method.

BACKGROUND

A document storage apparatus for storing and managing a plurality of electronic documents (electronic files) is known. Moreover, a system which distributes the electronic files stored in such an apparatus as conference materials is also known.

However, if all the conference materials are downloaded collectively, then the downloaded order becomes indeterminate. When the number of materials is large, a problem occurs that the proper page of a proper document referenced in an ongoing conference may not be available because it is downloaded later than the other pages.

DETAILED DESCRIPTION

An embodiment provides a document priority determination apparatus comprising a program schedule retrieving unit configured to retrieve schedules of programs of an event, a current time detection unit configured to detect a current time, and a priority determination unit configured to set a priority of a document based on the retrieved program schedules and the detected current time.

Embodiments are described below with reference to the accompanying drawings.

<First Embodiment>

Figure 1:
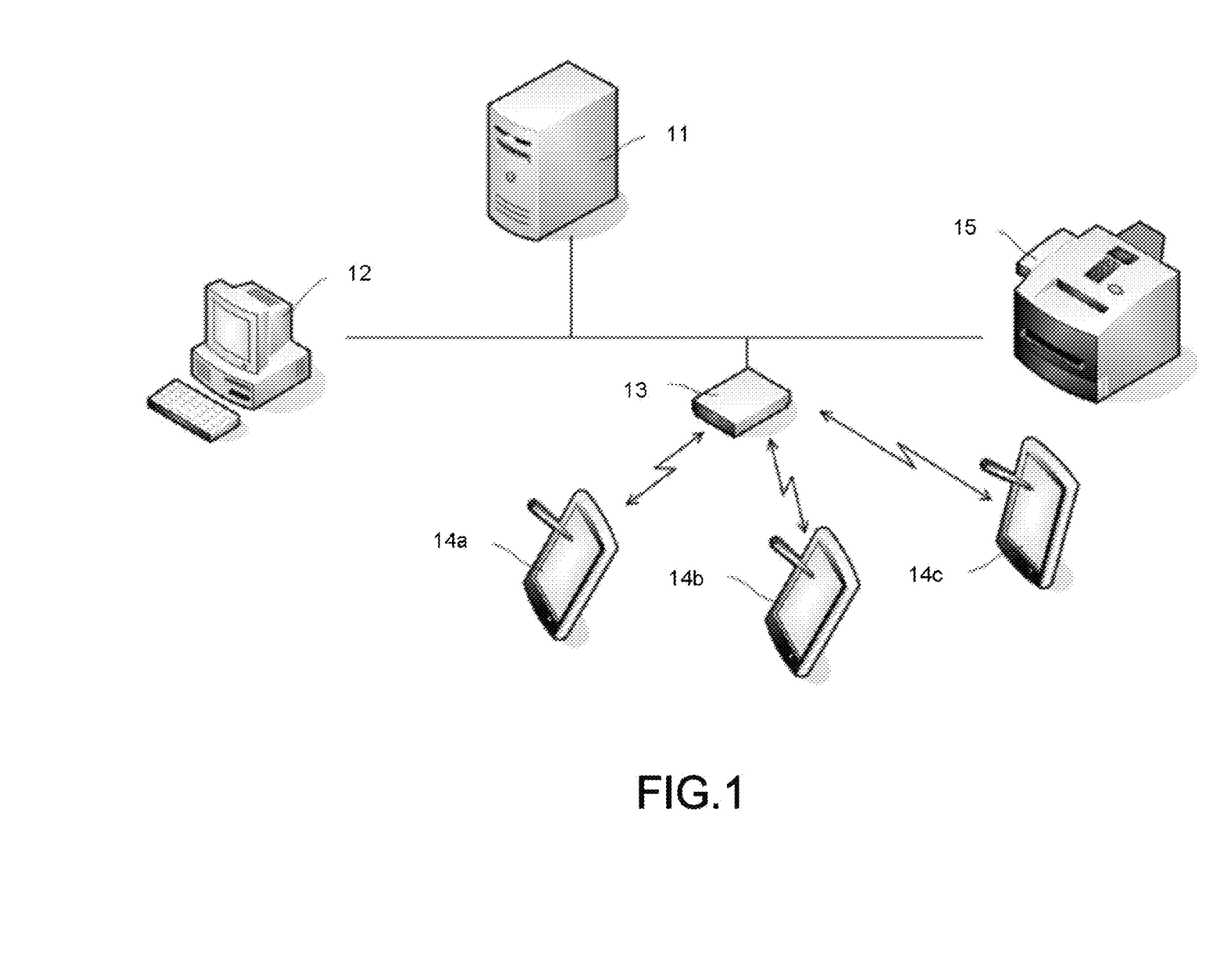
FIG. 1 is a diagram illustrating an example of the overall configuration of a document priority system of an embodiment.

FIG. 1 shows an example of the overall configuration of a document management system of the first embodiment. The system comprises a document management server 11 configured to store and manage the necessary documents as conference materials; a client PC 12 configured to carry out a processing such as the creating of the documents stored in the management server 11; the access point (router) 13 of a wireless LAN; tablet terminals 14a, 14b and 14c serving as a document priority determination apparatus carrying out wireless communication with the access point 13; and an MFP (multi-function peripheral) 15 capable of printing the documents stored in the management server 11 or sending the documents stored in the management server 11 to the outside. The document management server 11, the client PC 12, the access point 13 and the MFP 15 are connected to a network 16 such as an a LAN.

Although three tablet terminals 3 are shown in FIG. 1, the number of the tablet terminals may be 2 or more than 4. The number of the document management servers 11, the client PCs 12, the access points 13 and the MFPs 15 may be more than 2 as well.

The tablet terminals 14a, 14b and 14c are an example of a browsing terminal, and have a function of downloading the document stored in the management server 11 and displaying the downloaded document on a display screen, and are terminals capable of having an input function that is responsive to touching by the operator with, for example, fingers on the display screen.

Figure 2:
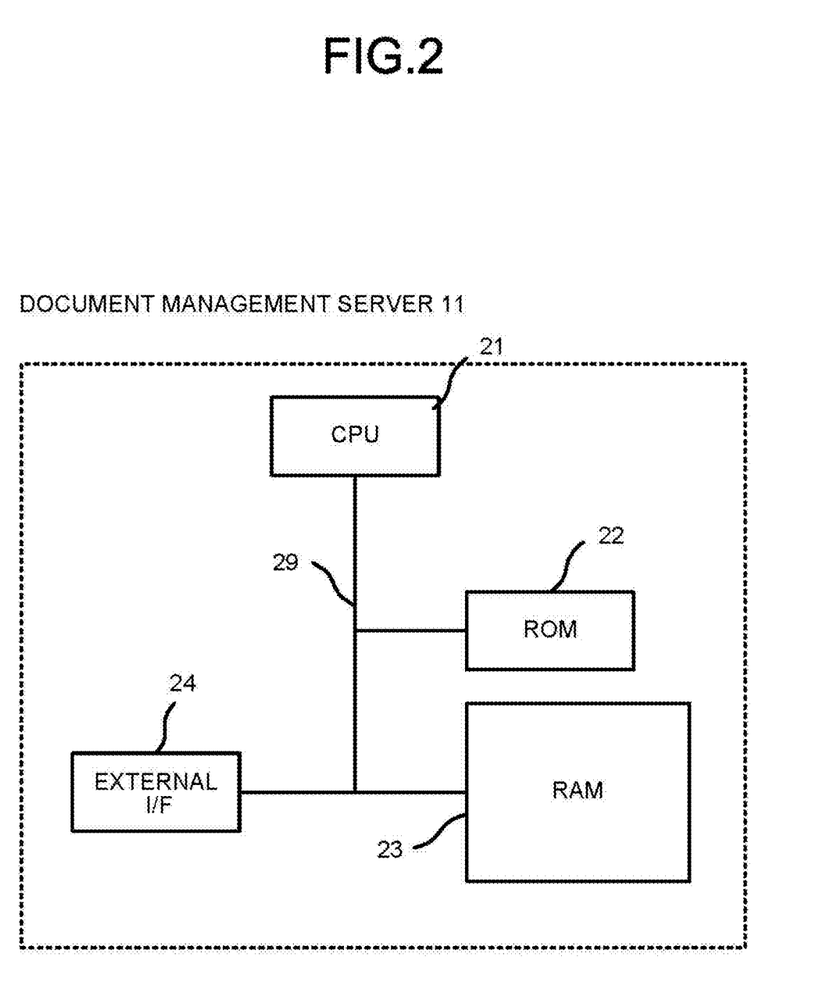
FIG. 2 is a diagram illustrating an example of the hardware configuration of a document management server according to an embodiment.

FIG. 2 shows an example of the hardware configuration of the document management server 11. The document management server 11 comprises a processor (CPU) 21 for controlling the entire server; a ROM (Read Only Memory) 22 for pre-storing the programs necessary for the server in a non-rewritable manner; a RAM (Random Access Memory) 23 for storing the applications and various data installed later in a rewritable manner; and an external interface (I/F) 24 connected to the LAN to carry out the sending and receiving of data and the like with the outside. The aforementioned components are electrically connected with each other via a common bus 29.

Figure 3:
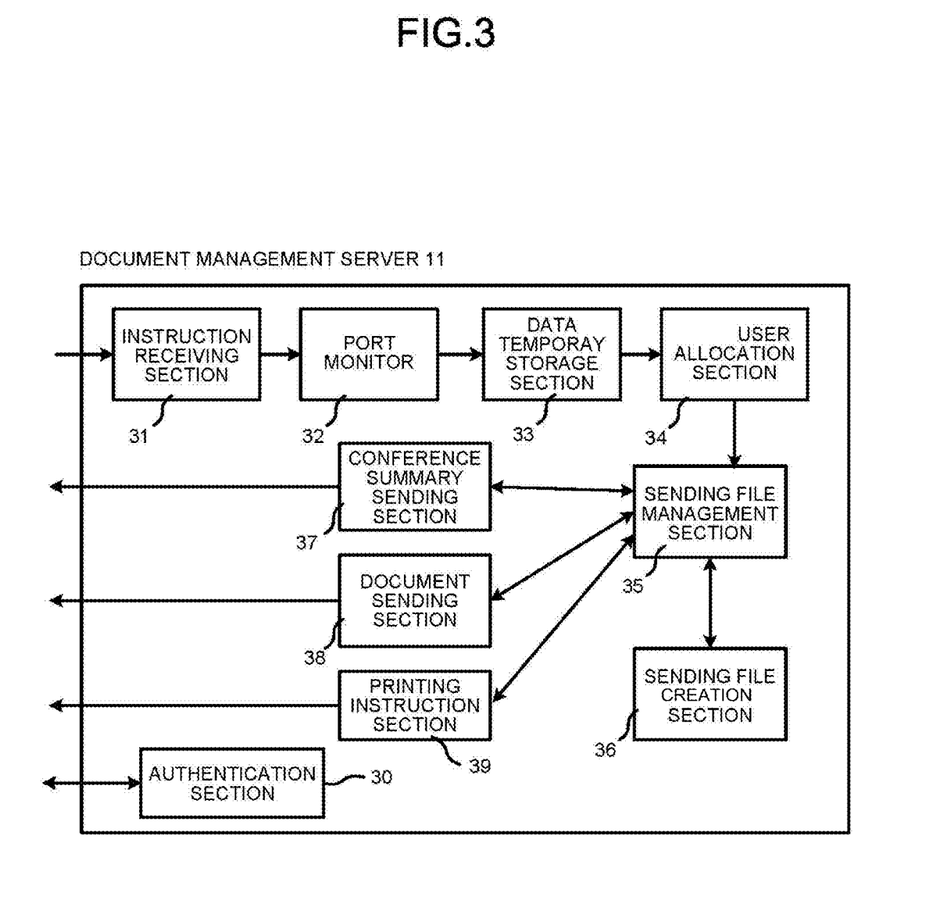
FIG. 3 is a diagram illustrating an example of the functional configuration of a document management server according to an embodiment.

FIG. 3 shows an example of the document management server 11 seen from a functional perspective. The document management server 11 comprises an authentication section 30 for carrying out an authentication when there is an access from the client PC 12 or each tablet terminal; an instruction receiving section 31 for receiving an instruction for displaying or printing from each tablet terminal; a port monitor 32 for transferring the received instruction file to a designated area; a temporary data storage section 33 for storing these data temporarily; a user allocation section 34 for allocating data for each user; a sending file management section 35 for managing the file sent to a tablet; a sending file creation section 36 for creating a sending file; a conference summary sending section 37 for creating a conference summary based on information and sending the conference summary to each tablet terminal; a document sending section 38 for sending the documents associated with each conference; and a printing instruction section 39 for instructing a printing operation when there is an instruction from a tablet terminal. The authentication section 30, the instruction receiving section 31, the port monitor 32, the temporary data storage section 33, the user allocation section 34, the sending file management section 35, the sending file creation section 36, the conference summary sending section 37, the document sending section 38 and the printing instruction section 39 cooperate with the CPU 21, the ROM 22 and the RAM 23.

Figure 4:
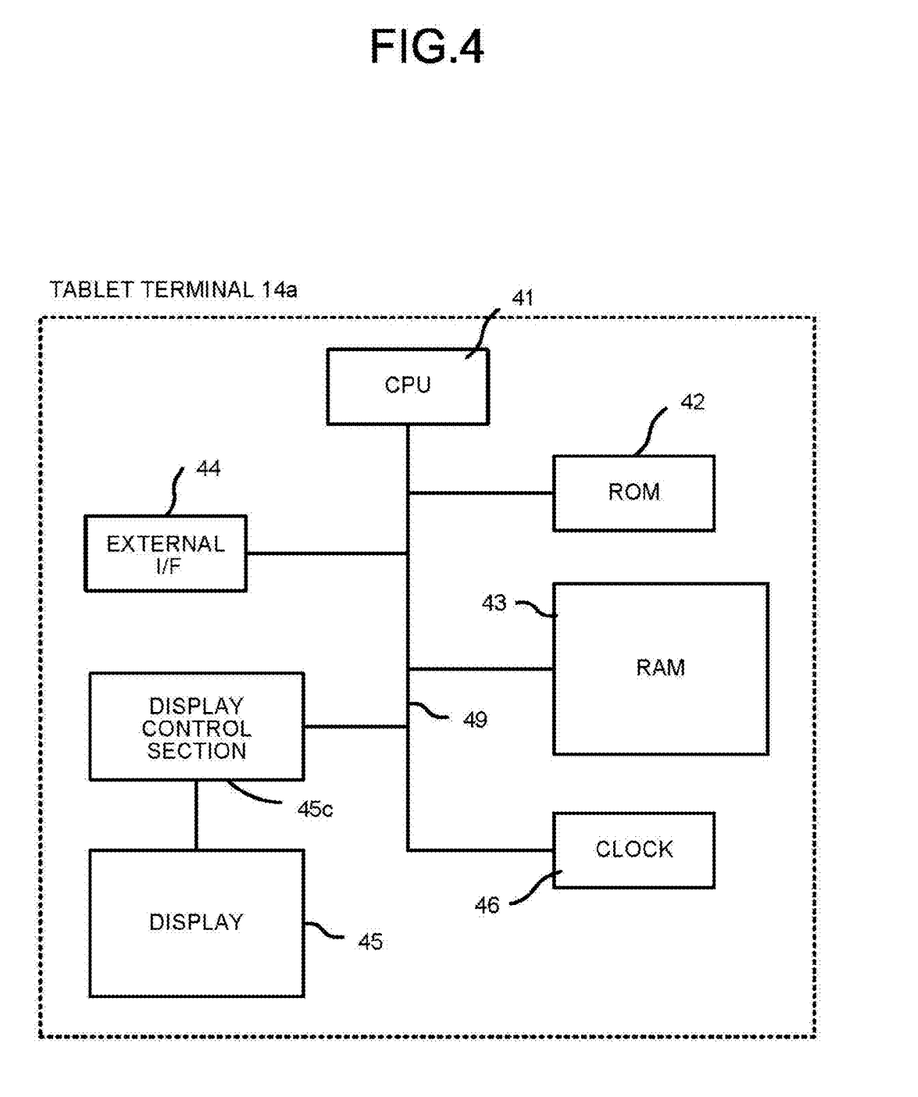
FIG. 4 is a diagram illustrating an example of the hardware configuration of a tablet terminal according to an embodiment.

FIG. 4 shows an example of the hardware configuration of the tablet terminal 14a. The tablet terminal 14a comprises a processor (CPU) 41 for controlling the entire terminal; a ROM (Read Only Memory) 42 for pre-storing the programs necessary for the tablet in a non-rewritable manner; a RAM (Random Access Memory) 43 for storing the applications installed later and various data in a rewritable manner; and an external interface (I/F) 44 for carrying out data sending/reception with the outside; a display 45 which displays the content of a document on a display screen and has a function of inputting through the aforementioned touch; a display control circuit 45c for carrying out the control on the display 45; and a clock 46 for detecting the current time. The components are electrically connected with each other via the common bus 49.

Next, the operations carried out in the embodiments are described. The client PC and the tablet terminals 14a, 14b and 14c access the document management server 11 in advance to be imparted with an ID and a password (PW). That is, the CPU detects the access from these machines and determines an ID and a PW for each machine and then stores the ID and the PW of each machine in the RAM 23.

Figure 5:
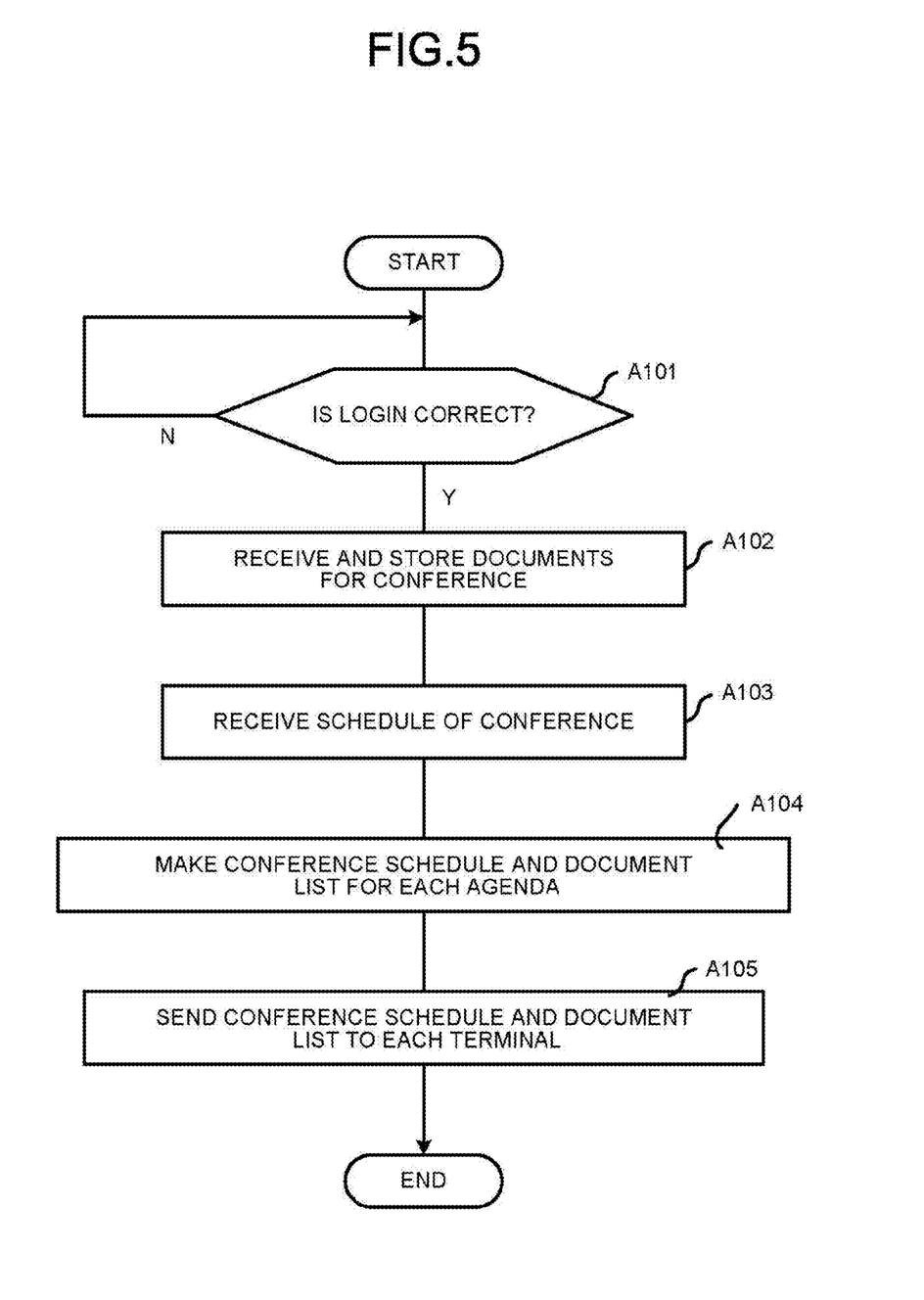
FIG. 5 is a diagram illustrating the operations of a document management server until the sending of a conference summary according to an embodiment.

First, the operations of storing the documents that make up the conference materials and managing the documents in the document management server 11 are described according to the flowchart shown in FIG. 5. Here, a case in which the client PC 12 creates the documents as conference materials is described. However, if the tablet terminals 14a, 14b and 14c have a document creating function, then the document may also be created by the tablet terminals 14a, 14b and 14c. However, the document created in another place may also be stored in the client PC 12 temporarily or sent to the document management server 11 via individual memory such as a USB.

The CPU 21 of the document management server 11 recognizes whether or not the login of the client PC 12 is correct, that is, the CPU 21 compares the ID and the password (PW) input by the client PC 12 accessing the document management server 11 with those stored in the RAM 23 to recognize whether or not the IDs and the PWs match (A101). In the document management server 11 shown in FIG. 3, the authentication section 30 detects whether or not the login is correct.

If recognized that the login of the client PC 12 is correct (Y in A101), the CPU 21 receives and stores the document sent from the client PC 12 (A102).

The document received by the document management server 11 is, for example, a material for a specific conference containing a plurality of agendas (also referred to herein as "programs"). A conference title, names of agendas and actually used materials are sent in, for example, a png form.

In FIG. 3, such a document serving as a conference material is sent from the instruction receiving section 31 to the sending file management section 35 through the port monitor 32, the temporary data storage section 33 and the user allocation section 34.

In the document management server 11, the CPU 21 receives the schedule of the conference from the client PC through an external I/F 24 and stores the received schedule in the RAM 23 (A103). A conference title, the agendas of the conference and the planned date and time of the conference and planned start time and end time of each agenda are contained in the schedule.

Figure 6:
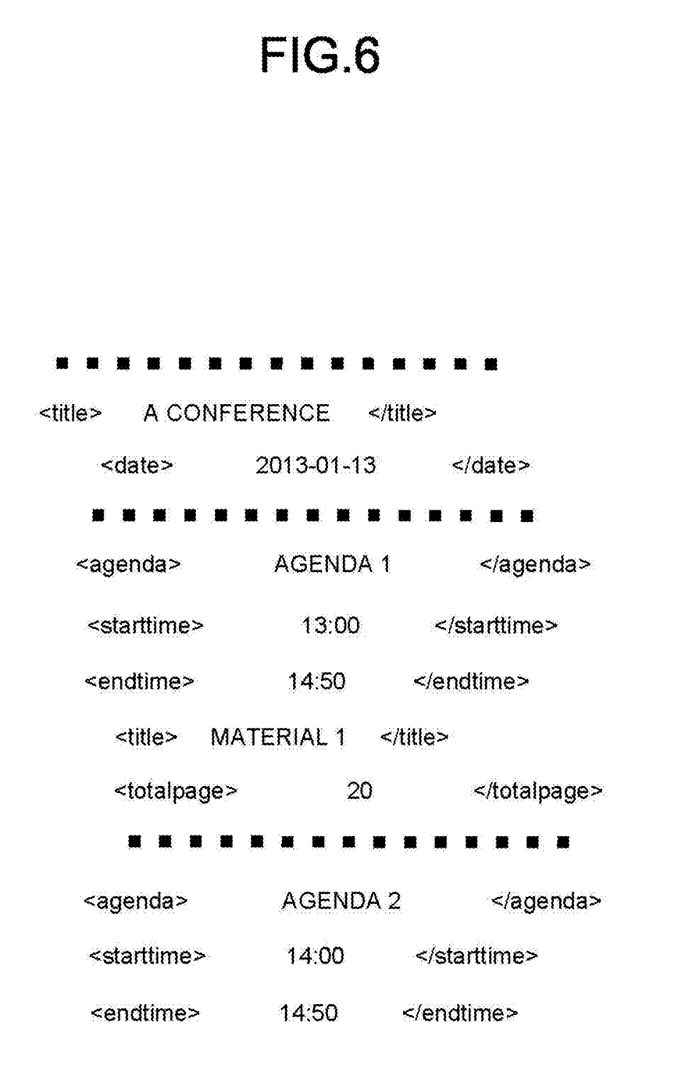
FIG. 6 is a diagram illustrating an example of an XML program structure of a conference summary sent from a document management server in an embodiment.

The CPU 21 makes the conference schedule (progress schedule time) and a list of documents for each agenda in the form of, for example, XML (A104). This example is shown in FIG. 6. The planned date of a conference title ('conference A' in this example) as well as agendas of the conference and the start time and the end time of each agenda (agendas 1 and 2 and the start times (13:00, 13:50) and the end times (14:00; 14:50) of the agendas), that is, a conference schedule, are contained in the XML program shown in FIG. 6. Moreover, the title (material 1) of each material of each agenda and a number of total pages, that is, a document list, are contained. Further, conference A, agendas 1 and 2 and material 1 and the like are displayed in the example recorded herein; however, specific titles would be recorded during actual usage.

The CPU 21 creates such a conference summary (conference schedule and document list) file (A104). In the functional blocks shown in FIG. 3, the file is created by the sending file creation section 36 (A104). The CPU 21 sends the created file to each tablet terminal through the external I/F 24 (A105). In the functional blocks shown in FIG. 3, the file is sent from the conference summary sending section 37 to each tablet terminal through the sending file management section 35.

Figure 7:
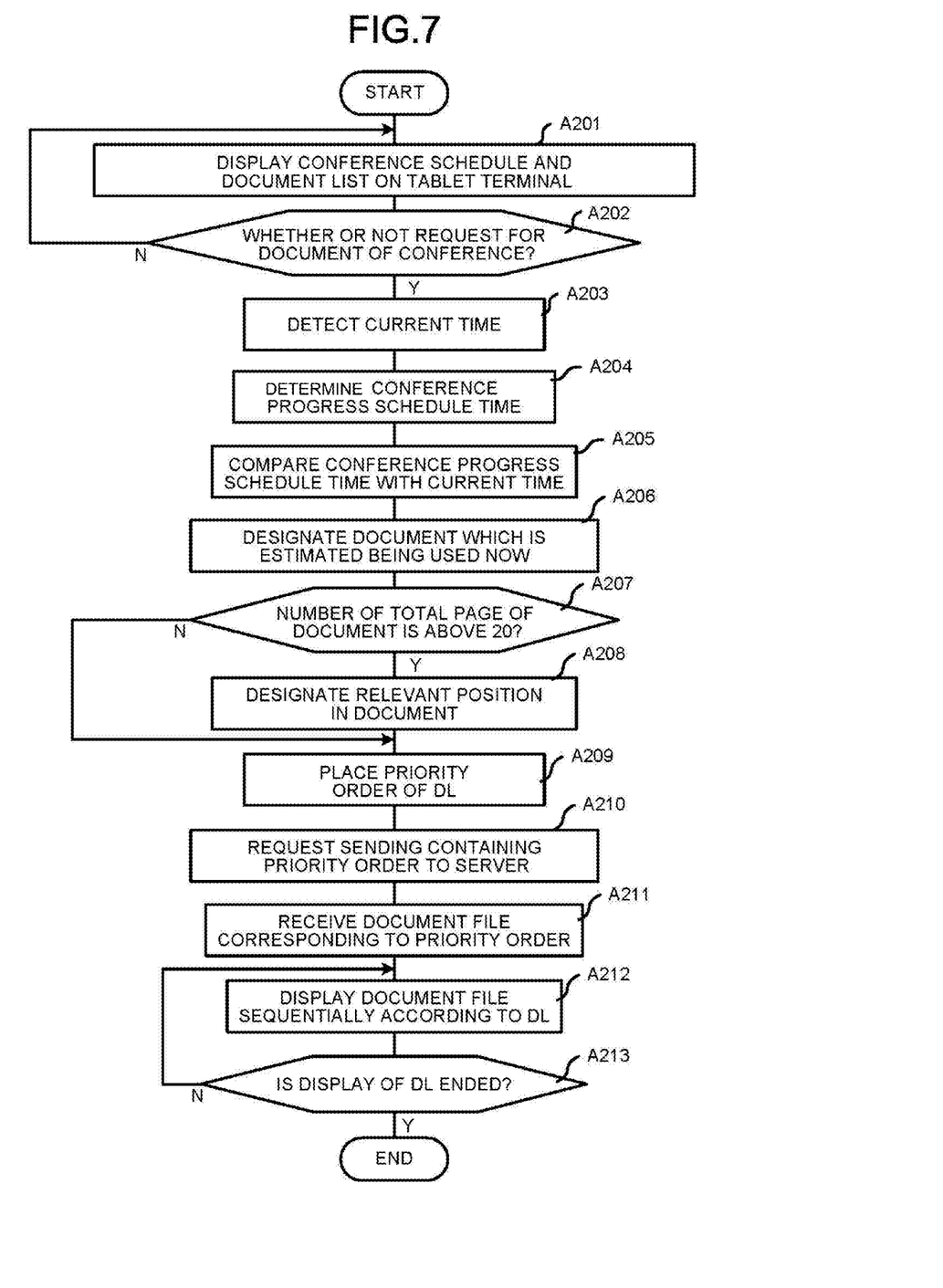
FIG. 7 is a diagram illustrating the operations of a tablet terminal in an embodiment.

Next, as stated above, the operations of the processing in the tablet terminal, such as the tablet terminal 14a, receiving the conference summary file in an automatic priority mode are described with reference to the flowchart shown in FIG. 7.

In the tablet terminal 14a, the CPU 41 receives the conference summary file sent by the document management server 11 through an external I/F 44 and stores the received file in the RAM 43.

Figure 8:
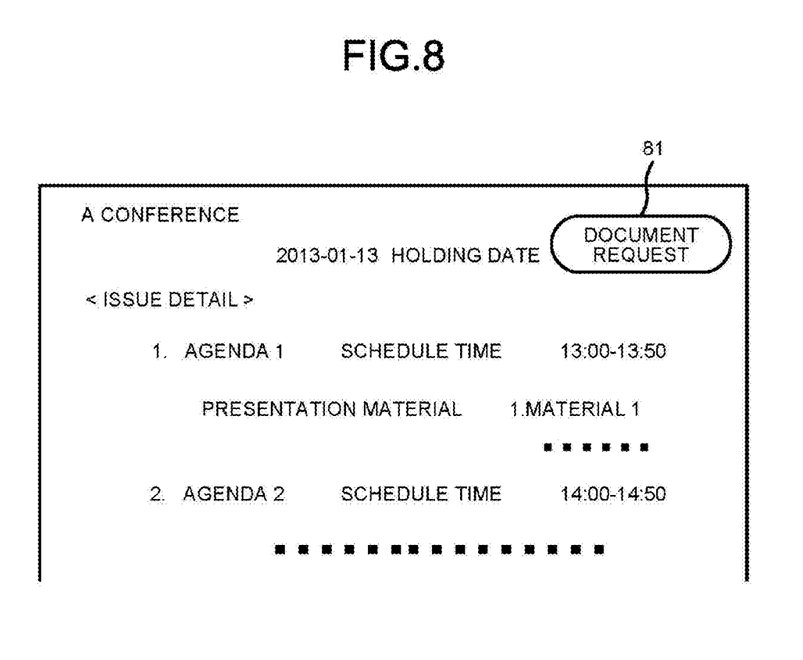
FIG. 8 is a diagram illustrating a display example of a conference in a tablet terminal of an embodiment.

The tablet terminal 14a displays, on the screen of the display 45 thereof, the conference schedule and the document list of each agenda contained in the conference summary file. This example is shown in FIG. 8. That is, the conference title, that is, 'conference A', and the planned date of the conference are displayed first, then 'agenda 1', start schedule time and end schedule time of 'agenda 1' and the document 'material 1' for the agenda are displayed in the next line (A201). If a plurality of a same kind of documents is used in an agenda, the documents are displayed in the use order thereof.

Figure 9:
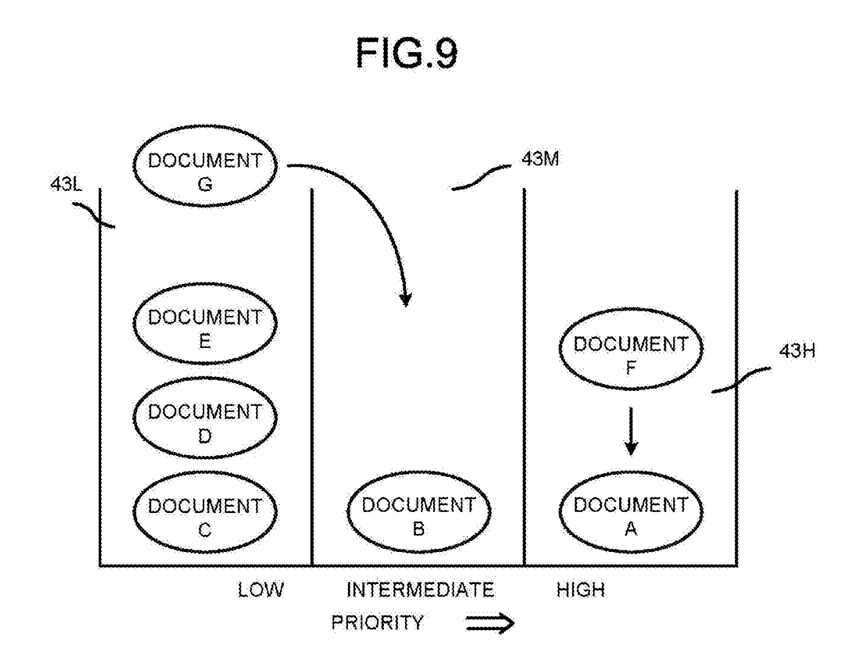
FIG. 9 is a diagram illustrating priority queues according to an embodiment.

Here, priorities of document transmission from the document management server 11 are described with reference to FIG. 9. FIG. 9 is a schematic diagram of a specific area of the RAM 43 of the tablet terminal 14a. High-priority queue, intermediate-priority queue, and low-priority queue, three queues (columns) are set corresponding to different priorities in FIG. 9. The document information having the highest sending priority is placed in a high-priority queue (first queue) 43H, the document information having intermediate priority is placed in an intermediate-priority queue (second queue) 43M, and the document information having low priority is placed in a low-priority queue (third queue) 43L.

Then, if there is a document in the queue 43H, then the document placed in the queue is sent first, otherwise, the document placed in the queue 43M is sent. It is assumed that there are documents A-G needed for a downloading at present.

In this case, when documents are placed in queues 43H, 43M and 43L as shown in FIG. 9, the document A is sent first, sequentially followed by document B, and then followed by documents C, D and E. If a document F is placed prior to the sending of the documents B, C, D and E, then the document F having the highest priority is sent first. If a document G is placed prior to the sending of the documents C, D and E, then the document G is sent first.

The characters displayed on the display 45 has a display function and an input function, both of which are capable of designating the characters displayed on the display 45 through a touch by an operator, and the CPU 41 controls the display control circuit 45c to carry out these displayed and input data processing.

A document request icon 81 is displayed on, for example, the right upper part of the displayed conference summary, and the CPU 41 detects whether or not the operator touches the icon through the display 45 and the display control circuit 45c (A202).

In the case in which there is a document request for the conference when the document request icon 81 is touched (Y in A202), then the CPU 41 detects the current time using the clock 46 (A203). The action A203 is part of the actions of the current time detection unit. Then, the progress schedule time of the conference is determined from the data stored in the RAM 43 and receiving the data shown in FIG. 6 (A204).

The CPU 41 compares the current time of the clock 46 with the progress schedule time of the conference (A205). The comparison in which the CPU 41 refers to an agenda order and compares the current time with the conference progress schedule time is carried out based on a time comparison using a comparison circuit.

If an agenda is estimated as being held now, the CPU 41 designates the document used in association with the agenda (A206). The action A206 is part of the actions of the current agenda estimation unit. If a plurality of documents is used, to what extent the agenda proceeds within the period from the start time of the agenda to the end time of the agenda is predicted, the order of the documents is detected and the document used currently is estimated.

Further, it is determined whether or not the number of total page of the documents designated at this time is large and whether or not it takes a long time to download the documents.

The CPU 41 checks the number of total page of the designated documents in ACT A206 and detects whether or not the number of total page is above 20 (A207). A number of total page 20 is not to be construed as a limitation for determining whether or not the number of total page of the designated documents is large and whether or not it takes a long time to download the documents.

If the number of total page is above 20 (Y in A207), the page of the estimated document currently being used in the agenda is estimated, and the relevant position of the page is designated (A208).

The CPU 41 of the tablet terminal 14a determines a priority order of download (DL) according to which a certain document is sent in a certain order, that is, the position of each queue shown in FIG. 9 (A209). The action A209 is part of the actions of the priority determination unit. If the number of page of the documents is below 20 (N in A207), the CPU 41 also proceeds to ACT A209.

Generally, as stated above, the document which is estimated to be most associated with the current agenda is placed in the queue 43H shown in FIG. 9 and set to be sent with highest priority. Further, if it is determined in A207 that the number of pages of the documents is above 20, a download priority is given to the page following the one that is estimated as the page currently being displayed. Then, the document relative to the agenda held just before the current agenda is downloaded, and then the document relative to a planned agenda to be held following the current agenda is downloaded, followed by the documents relative to the agenda estimated to be held now. The priority order is sent to the document management server 11 and placed in the plurality of priority queues shown in FIG. 9 in the document management server 11.

The CPU 41 determines the sending priority in this way, and makes an instruction signal of sending document and order (sending request signal) for instructing the document management server 11 in the RAM 43.

Further, it is also taken into consideration whether or not the progress of the agenda is later than planned, in this case, the document to be sent with highest priority may need to be changed to an earlier time, or the downloading may start from a prior page in the document. To what extent the document to be sent with highest priority is sent earlier may be set by the operator in advance. Alternatively, the time at which the document to be sent with highest priority is sent can be changed considering a downloading time.

In the following ACT A210, the CPU 41 sends a document sending request signal containing the priority determined as stated above via the external I/F 44.

On the other hand, in the document management server 11, the sending request signal is received by the instruction receiving section 33 shown in FIG. 3 and then sent to the sending file management section 35 through the port monitor 32, the temporary data storage section 33 and the user allocation section 34.

In the sending file management section 35, a sending order is determined considering the document priority contained in the sending request signal, and then documents are sent from the document sending section 38 to the tablet terminal 14a requesting the sending of the documents.

The CPU 41 starts to receive (download) the document files sent from the document management server 11 (A211). At this time, each document relative to the conference is downloaded from the documents directly associated with the current agenda according to each priority (A212). Thus, the operator of the tablet terminal 14a downloads the sent documents according to the priority requested first and can read the most desirable documents while receiving the documents.

The documents sequentially downloaded are displayed, and the processing is ended if the download and the display are both ended (A213). Generally, the download of all the documents based on the tablet terminal 14a is ended first, and the operator displays the downloaded documents on the display screen of the tablet terminal 14a in order.

Figure 10:
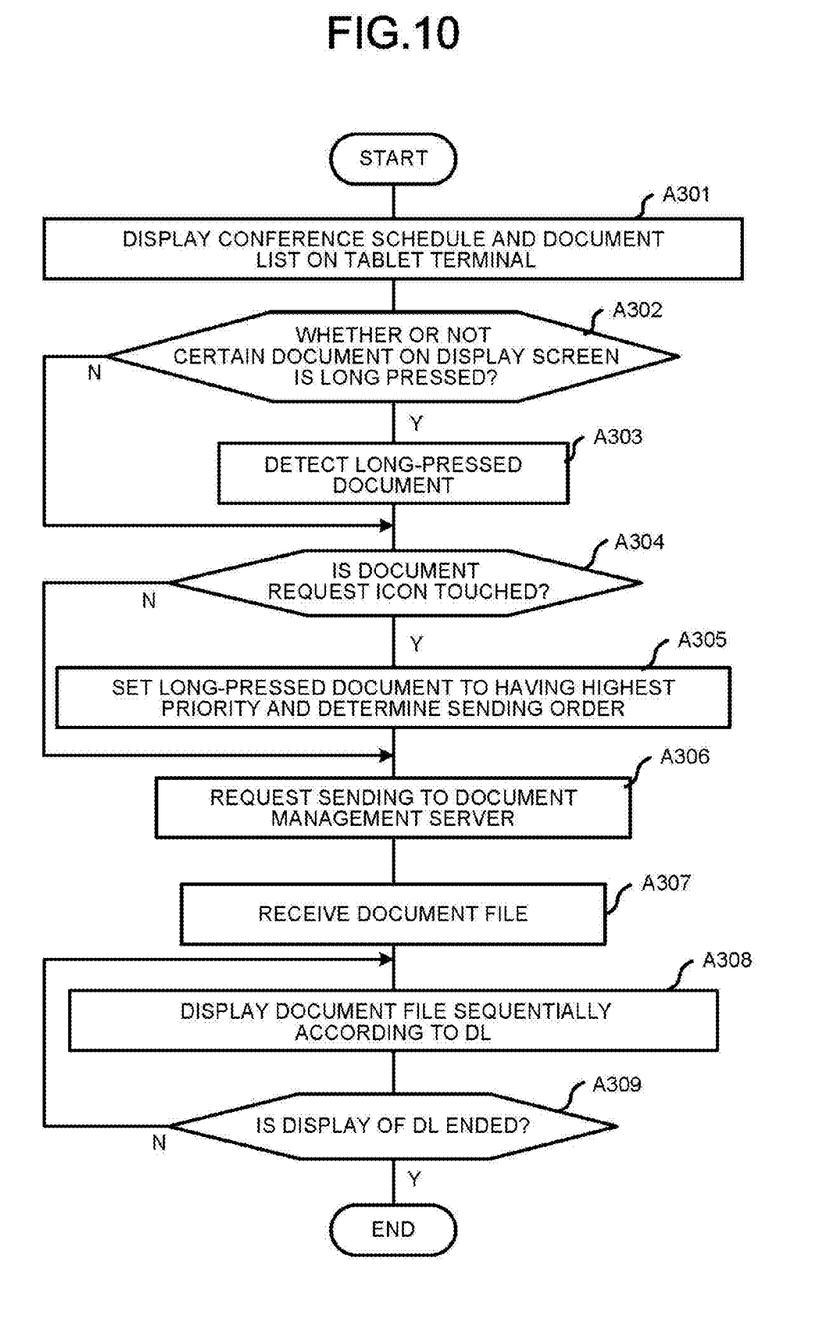
FIG. 10 is a diagram illustrating the operations in the case where a display document is pressed for a long time on a tablet terminal according to an embodiment.

Next, the operations carried out in the tablet terminal 14a in a specific priority mode and when an operator wants to download the designated document with highest priority are described below.

A conference schedule and a document list are displayed on the tablet terminal 14a. This display is carried out in the way shown in FIG. 8.

Next, the CPU 41 of the tablet terminal 14a detects whether or not display portion of a document displayed on the display screen of the display 45 is touched and long pressed (e.g., the touch time is twice as long as the reaction start time or longer) (A302) by the operator. If the display of any document is long pressed (Y in A302), the CPU 41 detects the long-pressed document (A303). ACT A303 is skipped if there is no long-pressing operation.

The CPU 41 detects whether or not the document request icon 81 shown in FIG. 8 is touched (ACT A304). If it detects that the document request icon 81 is touched (Y in A304), the CPU 41 sets the long-pressed document to highest priority and determines a sending order for the documents associated with the conference (A305). In the example of the display screen shown in FIG. 8, for example, if 'material 1' is long pressed and then the document request icon 81 is touched, then the 'material 1' is placed in the queue 43H shown in FIG. 9, and the sending order of the other documents is determined according to the priority order estimated based on current time. The sending order of the other documents, for example, is determined in the way described above with reference to FIG. 7.

Next, the CPU 41 sends a sending request signal for instructing a sending operation based on the determined sending order to the document management server 11 and the tablet terminal 14a (A306).

Further, if the document request icon is not touched (N in A304), the CPU 41 sends a sending request signal indicating a request to send only the long-pressed document to the document management server 11.

In the document management server 11, the CPU 21 receives the sending request signal through the external I/F 24 and inputs the signal to the RAM 23 to read the sending request signal.

In the configuration shown in FIG. 3, a document is sent to the sending file management section 35 through the instruction receiving section 31, the port monitor 32, the temporary data storage section 33 and the user allocation section 34. The terminal requesting the documents is the tablet terminal 14a, which is recognized by the user allocation section 34.

The document sending section 38 mastering the sending order of documents stores the order, and the CPU 21 sends the stored documents to the tablet terminal 14a in the storage order (first-in first-out) of the documents.

A single document or a series of documents sent from the document management server 11 are controlled by the CPU 41 of the tablet terminal 14a, received through the external I/F 44 and stored in the RAM 43 (A307).

The CPU 41 sequentially stores the document downloaded first and the documents downloaded later in the RAM 43 (A308). The operator enables the documents to be displayed according to the progress of the conference. Whether or not the download of the documents and the display as required are both ended is determined (A309). The CPU 41 ends all the processing if it detects that the downloading display of documents and display as required are both ended (Y in A309).

Further, when a printing instruction is carried out from a tablet terminal, the sending file management section 35 shown in FIG. 3 gives the printing instruction to the printing instruction section 39, and the document files corresponding to the designated document are sent to the MFP 15 and then printed. The printing case is similar to the aforementioned display, in which a priority is set in accordance with the progress of the conference; in order to send the document desired most, a sending request signal is sent from the tablet terminal to the document management server so that the documents can be printed using the MFP from the one having the highest priority.

Further, in the embodiments described above, a case in which the summary of a conference and a document list are downloaded to a tablet terminal and then displayed is described. However, the present invention is not limited to tablet terminal, and other terminals are also applicable which are capable of displaying a document while inputting information through a touch on the display screen thereof, such as a smart phone or a personal computer.

Further, the present invention is also applicable to a display terminal capable of carrying out an input with another input device such as a mouse even if no input instruction on a display screen.

In the embodiments described above, a case in which a sending order is determined according to the progress of a conference from a server from where documents are downloaded in a tablet terminal used for displaying, then the determined sending order is sent to a document management server and documents are downloaded from the server according to the instruction. However, it is also applicable that only a download request of the conference is sent from the tablet terminal to the document management server which then determines from which document a sending operation starts. That is, the document management server may function as the document priority determination apparatus.

In the embodiments, any of the processes described above can be accomplished by a computer-executable program, and this program can be embodied in a non-transitory computer-readable memory device. In the embodiments, the memory device, such as a magnetic disk, a flexible disk, a hard disk, an optical disk (CD-ROM, CD-R, DVD, and so on), an optical magnetic disk (MD and so on) can be used to store instructions for causing a processor or a computer to perform the processes described above. Furthermore, based on an instruction in the installed program, an OS (operating system) of the computer, or MW (middleware software), such as database management software or network, may execute one or more parts of the processes described above to realize the embodiments.

As stated above, in accordance with the embodiments, a document priority determination apparatus, a document display apparatus, a document management server and a document priority determination program for displaying and printing proper portions of the materials referred in an ongoing conference are obtained.

In addition, embodiments described herein are directed to determining priority of documents of a conference. The priority determination techniques described herein may be extended other types of events as long as there is a presenter who controls the document contents and viewers who want to download the document contents, such as lectures in academic environments and presentations in business environments.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A document priority determination apparatus, comprising:
    a network interface configured to receive and transmit data over a network;
    a current time detection unit configured to detect a current time; and
    a processor configured to:

control the network interface to receive, over the network, a schedule of programs of an event,
set a priority order of receiving plural documents over the network, the priority order being based on the received schedule of programs and the current time detected by the current time detection unit, and
control the network interface to transmit, over the network, a request to receive the documents in the priority order.

2. The document priority determination apparatus according to claim 1, wherein the plural documents are each associated with a scheduled program of the event.

3. The document priority determination apparatus according to claim 2, wherein a document associated with a program that is scheduled to be held during the current time is given higher priority in the priority order relative to another document not associated with a program that is scheduled to be held during the current time.

4. The document priority determination apparatus according to claim 3, wherein whether the program is scheduled to be held during the current time is determined from the retrieved schedule of programs and the detected current time.

5. The document priority determination apparatus according to claim 2, wherein one of the plurality of documents is associated with a program that is scheduled to be held during the current time and includes a first portion and a second portion, and the first portion is given higher priority in the priority order relative to the second portion if the first portion is estimated as being used during the current time.

6. The document priority determination apparatus according to claim 5, wherein the first portion is estimated as being used during the current time based on the retrieved schedule of programs and the detected current time.

7. The document priority determination apparatus according to claim 1, wherein the processor is further configured to set the priority order so that a particular document has the highest priority in the priority order if a specific request for the particular document is detected.

8. The document priority determination apparatus according to claim 1, wherein the request to receive the documents in the priority order is transmitted to a server that stores the documents, and the documents are received by the network interface according to the priority order.

9. The document priority determination apparatus according to claim 8, wherein the event is a conference and the documents contain contents presented during the scheduled programs of the conference.

10. The document priority determination apparatus according to claim 1, wherein the network interface, the current time detection unit, and the processor are implemented in a handheld computing device.

11. A document priority determination method for downloading documents, comprising:
receiving, over a network, a schedule of programs of an event;
detecting a current time;
setting a priority order of receiving plural documents based on the received schedule of programs and the detected current time;
transmitting, over the network to a server that stores the documents, a request to transmit the plural documents in the priority order; and
receiving, over the network from the server, the plural documents in the priority order.

12. The method of claim 11, wherein the plural documents are each associated with a scheduled program of the event.

13. The method of claim 12, further comprising:
determining whether a program is scheduled to be held during a current time based on the received schedule of programs and the detected current time.

14. The method of claim 13, wherein a document associated with the program that is scheduled to be held during the current time is given higher priority in the priority order relative to another document not associated with the program that is scheduled to be held during the current time.

15. The method of claim 14, wherein a document associated with the program scheduled to be held during the current time includes a first portion and a second portion, and the first portion is given higher priority in the priority order relative to the second portion if the first portion is estimated as being used during the current time.

16. The method of claim 11, further comprising:
detecting a specific request for a particular document,
wherein the priority of the particular document is set to have the highest priority in the priority order if the specific request for the document is detected.

17. A handheld computing device comprising:
a network interface configured to receive and transmit data over a network from an event server;
a current time detection unit configured to detect a current time; and
a processor configured to:
control the network interface to receive, over the network, a schedule of programs of an event,
set a priority order of receiving plural documents associated with the programs based on the received schedule of programs and the current time detected by the current time detection unit, and
control the network interface to:
transmit, over the network, a request to receive the documents in the priority order, and
receive, over the network, the documents in the priority order.

18. The device of claim 17, wherein a document associated with a program that is scheduled to be held during the current time is given higher priority in the priority order relative to another document not associated with a program that is scheduled to be held during the current time.

19. The device of claim 18, wherein whether the program is scheduled to be held during the current time is determined from the retrieved schedule of programs and the detected current time.

20. The device of claim 17, wherein the processor is further configured to set the priority order so that a particular document has the highest priority if a specific request for the particular document is detected.

* * * * *